US012479206B2

(12) United States Patent
Murakami et al.

(10) Patent No.: US 12,479,206 B2
(45) Date of Patent: Nov. 25, 2025

(54) WAFER, AND LIQUID EJECTION CHIP

(71) Applicant: CANON KABUSHIKI KAISHA, Tokyo (JP)

(72) Inventors: Ryotaro Murakami, Kanagawa (JP); Manabu Otsuka, Kanagawa (JP); Masaya Uyama, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 18/522,481

(22) Filed: Nov. 29, 2023

(65) Prior Publication Data

US 2024/0190132 A1 Jun. 13, 2024

(30) Foreign Application Priority Data

Dec. 7, 2022 (JP) ................................. 2022-195579

(51) Int. Cl.
*B41J 2/16* (2006.01)

(52) U.S. Cl.
CPC ........... *B41J 2/1635* (2013.01); *B41J 2/1623* (2013.01)

(58) Field of Classification Search
CPC ...... B41J 2/1635; B41J 2/1623; B41J 2/1628; B41J 2/1603; B41J 2/1629; B41J 2/1631; B41J 2/1632; B41J 2/1645
See application file for complete search history.

(56) References Cited

U.S. PATENT DOCUMENTS 9,925,776 B2 3/2018 Takahashi et al.
2021/0031524 A1* 2/2021 Yonemoto .............. B41J 2/1628

FOREIGN PATENT DOCUMENTS

JP 2017-228605 A 12/2017

* cited by examiner

*Primary Examiner* — Lisa Solomon
(74) *Attorney, Agent, or Firm* — VENABLE LLP

(57) ABSTRACT

An object is to provide a wafer, and a liquid ejection chip which are capable of preventing a decrease in yield. To that end, an adhesive agent accumulation portion is provided at which an adhesive agent coming out of a gap between a first channel substrate and a second channel substrate accumulates and stays away from a bottom of a groove.

8 Claims, 13 Drawing Sheets

DT AA

WAFER, AND LIQUID EJECTION CHIP

BACKGROUND OF THE INVENTION

Field of the Invention

The present invention relates to a wafer to be used to manufacture liquid ejection heads, and a liquid ejection chip.

Description of the Related Art

It is known that liquid ejection chips to be used in the ejection heads of liquid ejection apparatuses are formed as micro electro mechanical systems (MEMS) devices obtained by joining multiple members in which grooves and through-holes to be channels are formed. An adhesive agent is typically used to join the members. Multiple liquid ejection chips are formed in a substrate called a wafer, and the substrate is cut and divided into individual liquid ejection chips. Grooves are formed in cutting portions of the substrate in advance, and the substrate is cut along those groove portions.

Japanese Patent Laid-Open No. 2017-228605 discloses a method in which groove are provided in a substrate along intended cutting portions which are inclined relative to the substrate's crystal orientation plane and the substrate is cut along the grooves by dicing.

Here, there is a case where an adhesive agent to be used to join members enters such a groove portion. In a case where the substrate is cut along the groove in which the adhesive agent has entered, a piece of the adhesive agent may remain at the cutting portion. In the case where a piece of the adhesive agent remains at cutting portion, the piece of the adhesive agent sometimes sticks out of the outer shape of the liquid ejection chip and interferes with the adjacent liquid ejection chip, thereby making it impossible to properly mount the liquid ejection chip. This may decrease the process yield.

SUMMARY OF THE INVENTION

In view of the above, the present invention provides a wafer, and a liquid ejection chip which are capable of preventing a decrease in yield.

To that end, the wafer of the present invention is a wafer comprising: a first substrate in which a groove is formed; a second substrate which is joined by an adhesive agent to a surface of the first substrate where the groove is formed, and in which an opening is formed at a position where the opening overlaps the groove in the state where the first substrate and the second substrate are joined to each other; and an adhesive agent accumulation portion at which the adhesive agent coming out of a gap between the first substrate and the second substrate accumulates and stays away from a bottom of the groove. The wafer is to be cut along the groove and the opening.

According to the present invention, it is possible to provide a wafer, and a liquid ejection chip, which are capable of preventing a decrease in yield.

Further features of the present invention will become apparent from the following description of exemplary embodiments with reference to the attached drawings.

DESCRIPTION OF THE EMBODIMENTS

First Embodiment

A first embodiment of the present invention will be described below with reference to drawings.

Figure 1:
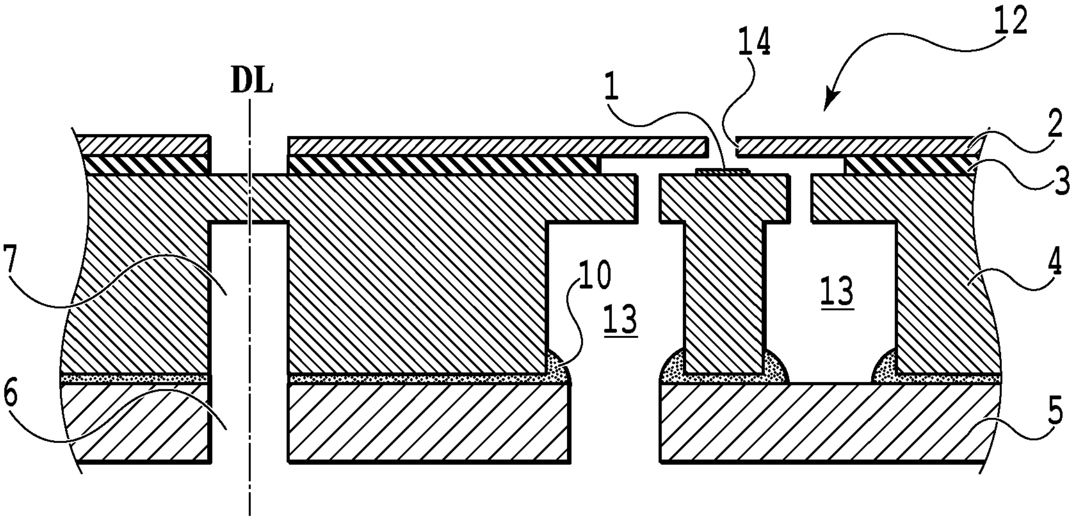
FIG. 1 is a view illustrating a wafer for liquid ejection heads.

FIG. 1 is a view illustrating a cross section of a part of a wafer for liquid ejection heads (hereinafter also referred to simply as "wafer") 12 to be used to manufacture common liquid ejection heads. The wafer 12 is formed by laminating a substrate 4 in which grooves 7 and a through-holes 13 are formed, a channel layer 3, and a nozzle layer 2 on and above a substrate 5 in which openings 6 are formed. Also, energy generation elements 1 corresponding to ejection ports 14 in the nozzle layer 2 are provided on the substrate 4. The substrates 4 and 5 are joined by an adhesive agent 10. The grooves 7 in the substrate 4 and the openings 6 in the substrate 5 are provided so as to overlap each other in the state where the substrates 4 and 5 are joined. The centers of each groove 7 and the corresponding opening 6 are defined as an intended cutting line DL. The wafer 12 is divided into multiple liquid ejection chips by cutting it along the intended cutting lines DL by dicing or the like.

Figure 2A:
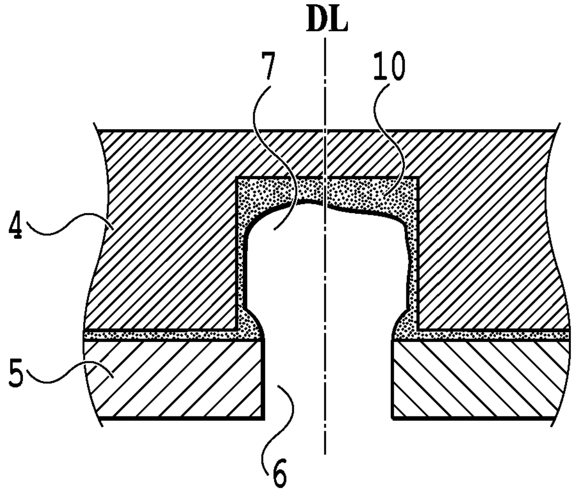
FIG. 2A is an enlarged view of a cutting portion of the wafer.
Figure 2B:
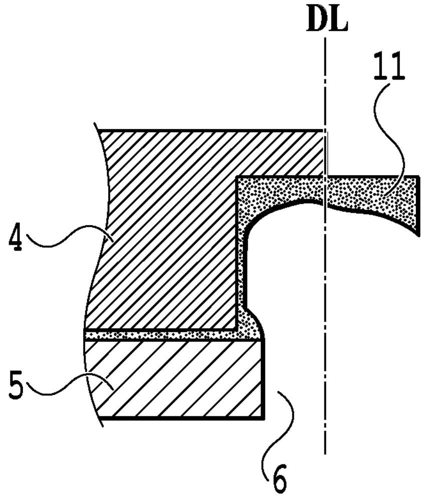
FIG. 2B is an enlarged view of the cutting portion of the wafer.

FIGS. 2A and 2B are enlarged views of a cutting portion of the wafer 12. As illustrated in FIG. 2A, the adhesive agent 10 for joining the substrates 4 and 5 may enter the groove 7 from corner portions of the groove 7 and reach the bottom of the groove 7 as a capillary force acts on the adhesive agent 10. FIG. 2A illustrates a state before the cutting where the adhesive agent 10 has reached and accumulated in the bottom of the groove 7. In a case where the wafer 12 is cut along the intended cutting line DL with the adhesive agent 10 having flowed in and cured in the groove 7 as illustrated in FIG. 2A, a piece 11 of the adhesive agent 10 may remain at the cutting portion and stick out of the cutting portion as illustrated in FIG. 2B. The liquid ejection chips formed by cutting the wafer 12 will be arrayed to form a liquid ejection head. Here, in the case where the piece 11 of the adhesive agent 10 sticks out of the cutting portion, the piece 11 may interfere with the adjacent liquid ejection chip when the liquid ejection chips are arrayed.

Figure 3A:
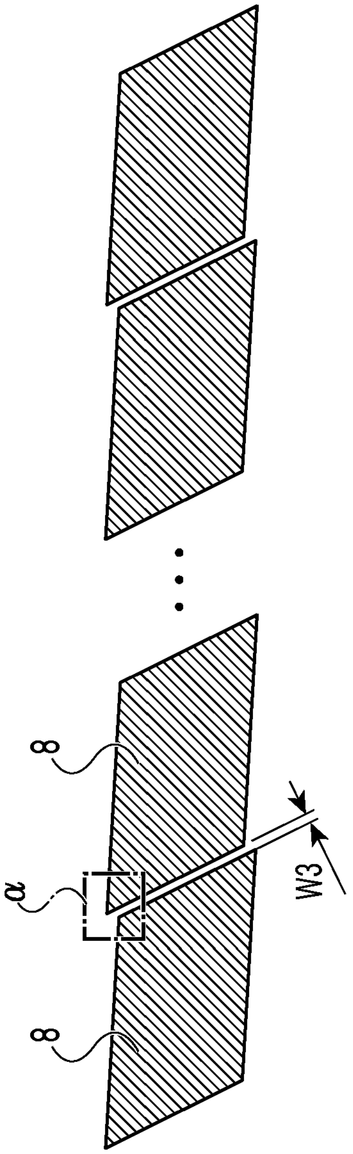
FIG. 3A is a view illustrating liquid ejection chips.
Figure 3B:
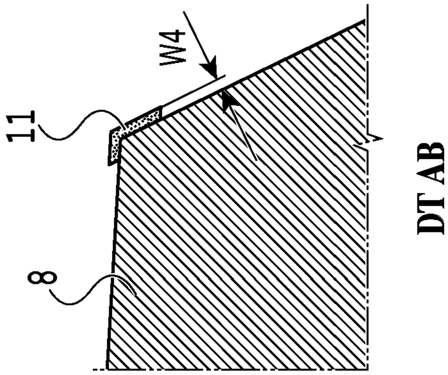
FIG. 3B is a view illustrating a liquid ejection chip.

FIG. 3A is a view illustrating a state where liquid ejection chips 8 are arrayed. FIG. 3B is an enlarged view of a part of the α section in FIG. 3A. The chip interval between the arrayed liquid ejection chips 8 is denoted as W3 (see FIG. 3A). The width of the piece 11 of the adhesive agent 10 sticking out of a side surface of a liquid ejection chip 8 is denoted as W4 (see FIG. 4). In a case where W4>W3, the piece 11 of the adhesive agent 10 sticking out of the side surface of the liquid ejection chip 8 interferes with the adjacent liquid ejection chip 8, thus making it impossible to mount the liquid ejection chip 8.

To address this, the present embodiment employs a configuration to prevent the formation of a piece of the adhesive agent on side surfaces of the substrate 4 when the substrates 4 and 5 are joined to thereby prevent a decrease in the yield of the manufacturing process. A method to achieve this will be described in detail below.

Figure 4B:
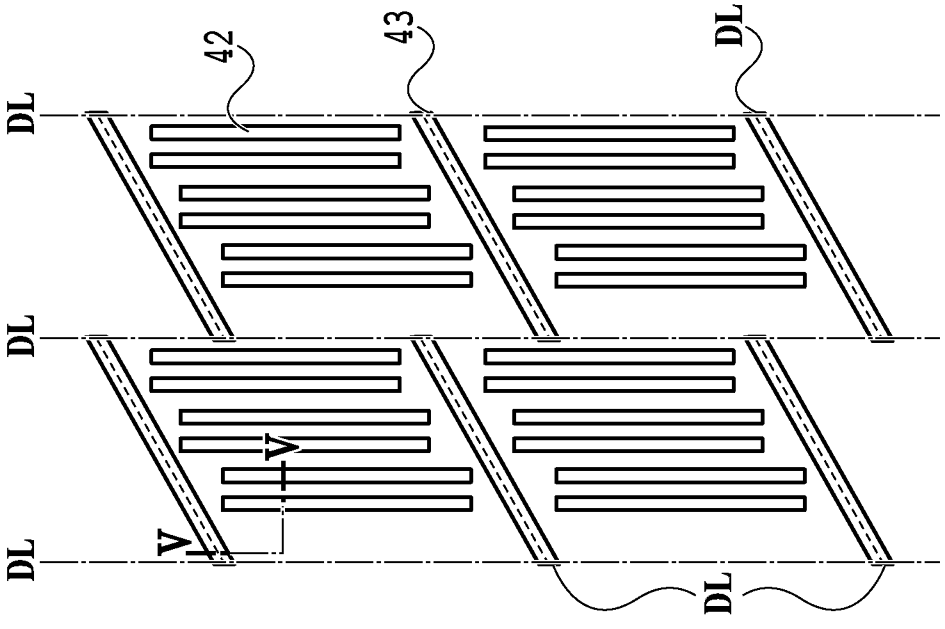
FIG. 4B is a view illustrating the wafer for liquid ejection heads.
Figure 4A:
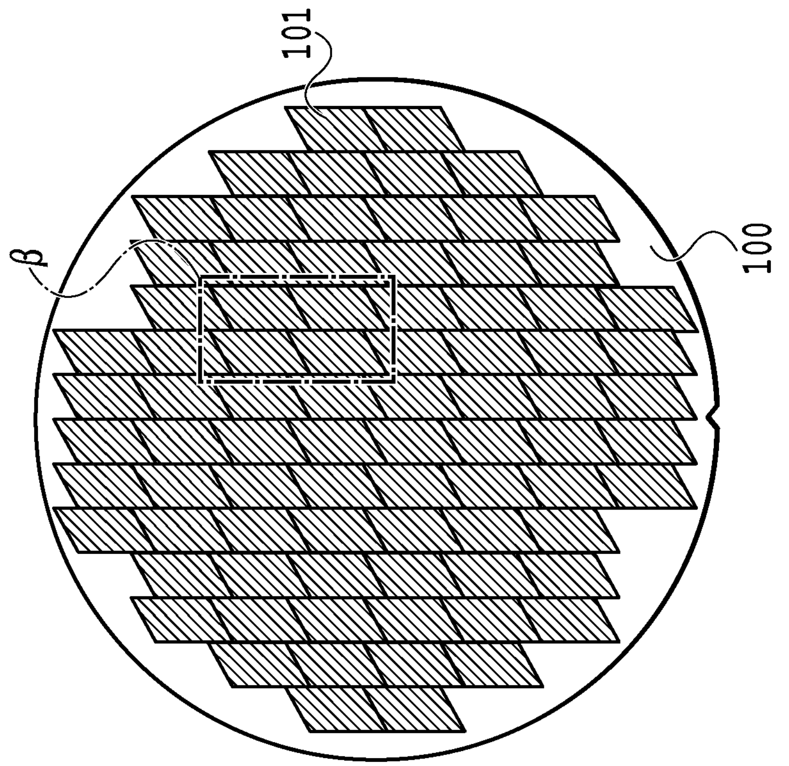
FIG. 4A is a view illustrating a wafer for liquid ejection heads.

FIGS. 4A and 4B are views illustrating a wafer for liquid ejection heads (hereinafter also referred to simply as "wafer") 100 in the present embodiment. FIG. 4A is a view illustrating the entire wafer 100. FIG. 4B is an enlarged view of the β section in FIG. 4A. Note that the illustrations of FIGS. 4A and 4B omit depiction of the second channel substrate to be described later. In the wafer 100, multiple liquid ejection chips 101 are formed, and multiple grooves 43 and through-holes 42 to be used for dividing the liquid ejection chips 101 are formed. By being cut along intended cutting lines DL, the wafer 100 becomes individual liquid ejection chips 101. The intended cutting lines DL are set so as to partly pass the centers of the respective grooves 43.

Figure 5:
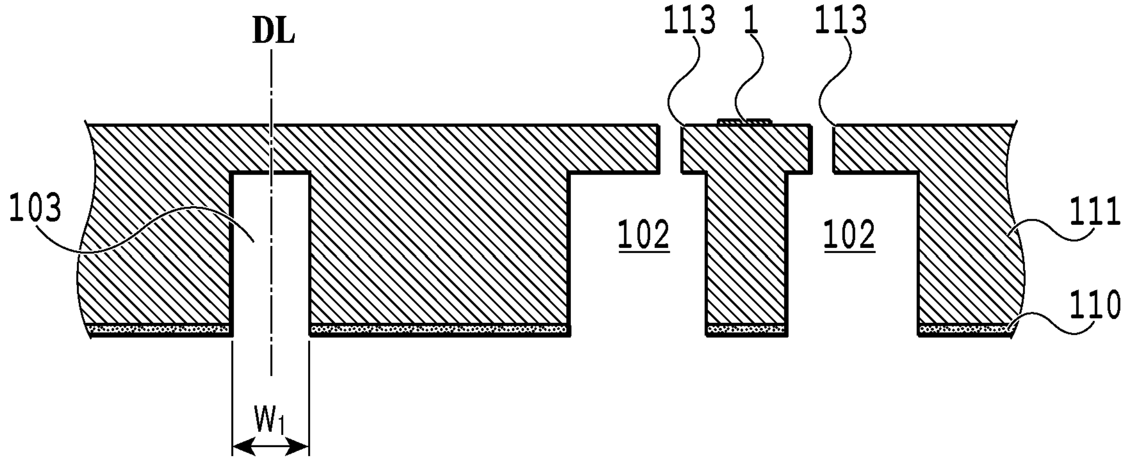
FIG. 5 is a view illustrating a first channel substrate.

FIG. 5 is a view illustrating a first channel substrate 111 forming a part of the wafer 100, and is a cross-sectional view of the first channel substrate 111 taken along the V-V plane in FIG. 4B. The wafer 100 is formed by laminating multiple substrates, and the first channel substrate 111 is one of the substrates to be laminated. In the first channel substrate 111, there are formed multiple through-holes 102 which will form the through-holes 42 (see FIG. 4B) and multiple grooves 103 which will form the grooves 43. In FIG. 4B, the through-holes 42 are illustrated as through-holes in the wafer 100. Since depiction of the later-described second channel substrate is omitted in FIG. 4B, the through-holes 42 and through-holes 102 represent substantially the same holes. Likewise, the grooves 43 and the grooves 103 represent substantially the same grooves.

The through-holes 102 and the grooves 103 are formed from the surface of the first channel substrate 111 on which a nozzle layer 2 to be described later will not be formed. The width of the grooves 103 in a width direction crossing the cutting direction in which the wafer 100 is cut along the grooves 103 will be denoted as "width W1". Multiple energy generation elements 1 that generate an energy for ejecting a liquid are formed on the first channel substrate 111 in arrays in a direction perpendicular to the sheet plane of FIG. 5 (array direction). Specifically, the multiple energy generation elements 1 are provided in arrays along the elongated through-holes 102. Examples of the energy generation elements 1 include heating resistive elements and piezoelectric elements. Incidentally, depiction of wirings to supply power to the energy generation elements 1, pads for connecting electrodes, and so on is omitted.

Examples of the method of forming the through-holes 102 and the grooves 103 in the first channel substrate 111 include dry etching and wet etching. In one method of forming the through-holes 102, non-penetrating grooves are formed from one surface of the first channel substrate 111, and then the portions to be channels 113 are processed from the opposite surface (the surface on which the energy generation elements 1 are placed) to make the non-penetrating grooves penetrate through the first channel substrate 111.

Figure 6:
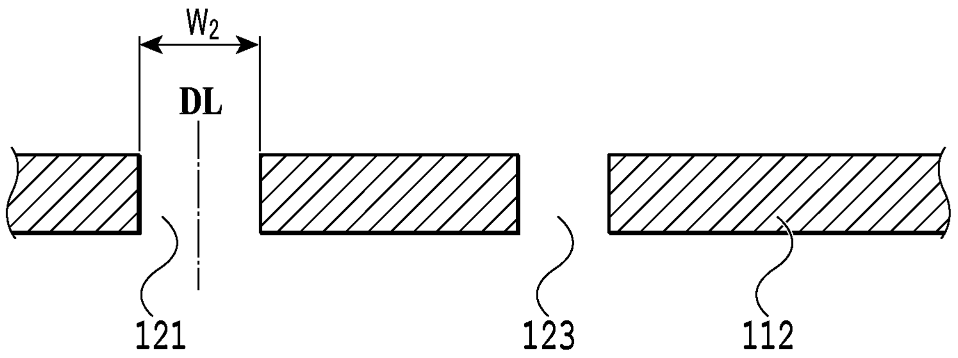
FIG. 6 is a view illustrating a second channel substrate.

FIG. 6 is a view illustrating a second channel substrate 112 forming a part of the wafer 100, and is a cross-sectional view of the second channel substrate 112 taken along the V-V plane in FIG. 4B. Openings 121 and through-holes 123 are formed in the second channel substrate 112. Examples of the method of forming the openings 121 and the through-holes 123 in the second channel substrate 112 include one in which the substrate is penetrated from one surface to the opposite surface by dry etching or wet etching, and one in which non-penetrating holes are formed from one surface and the substrate is thinned down by backgrinding or chemical-mechanical polishing (CMP) to make the non-penetrating holes penetrate through the substrate. The width of the openings 121 in the width direction crossing the cutting direction will be denoted as "width W2".

The relation between the width W1 of the grooves 103 in the first channel substrate 111 and the width W2 of the openings 121 in the second channel substrate 112 satisfies a relation of width W1<width W2. While silicon is a preferable as the materials of the first channel substrate 111 and the second channel substrate 112, other examples of the materials include silicon carbide, silicon nitride, and various kinds of glass (quartz glass, borosilicate glass, alkali-free glass, and soda glass). Further examples of the materials of the first channel substrate 111 and the second channel substrate 112 include various ceramics (alumina, gallium arsenide, gallium nitride, and aluminum nitride) and resins.

The first channel substrate 111 and the second channel substrate 112 are joined using an adhesive agent 110. A material having high adhesiveness to each substrate is preferably used as the adhesive agent 110. Also, a material that do not easily trap bubbles and the like and has high applicability is preferable, and a material that has low viscosity, making it easy to make the adhesive agent 110 thin, is preferable. The adhesive agent 110 preferably contains a resin selected from the group consisting of an epoxy resin, an acrylic resin, a silicon resin, a benzocyclobutene resin, a polyamide resin, a polyimide resin, and a urethane resin. Examples of the method of curing the adhesive agent 110 include a thermosetting method and an ultraviolet (UV) delayed curing method. An UV curing method is also usable in a case where either of the substrates is UV transmissive.

Examples of the method of applying the adhesive agent 110 include an adhesive agent transfer method using a transfer substrate. Specifically, a transfer substrate is prepared, and the adhesive agent is applied thinly and evenly onto the transfer substrate by spin coating or slit coating. Then, the bonding surface of the first channel substrate 111 is brought into contact with the applied adhesive agent to thereby transfer the adhesive agent only to the first channel substrate 111. The size of the transfer substrate is preferably equal to or larger than the size of the first channel substrate 111. A film of silicon, glass, polyethylene terephthalate (PET), polyethylene naphthalate (PEN), phenyl isocyanate (PI), or the like is preferably used as the substrate. Examples of a method of directly applying the adhesive agent to the first channel substrate 111 include screen printing and dispense coating. The above description has been given using the first channel substrate 111 as an example. The adhesive agent may be applied to the second channel substrate 112.

The first channel substrate 111 to which the adhesive agent 110 has been applied and the second channel substrate 112 are heated to a predetermined temperature inside a joining apparatus and are then pressed against each other at a predetermined pressure for a predetermined time to be joined. These parameters for the joining are set as appropriate according to the adhesive material. It is preferable to join the substrates in a vacuum in order to prevent inclusion of bubbles into the joining portion.

Figure 7:
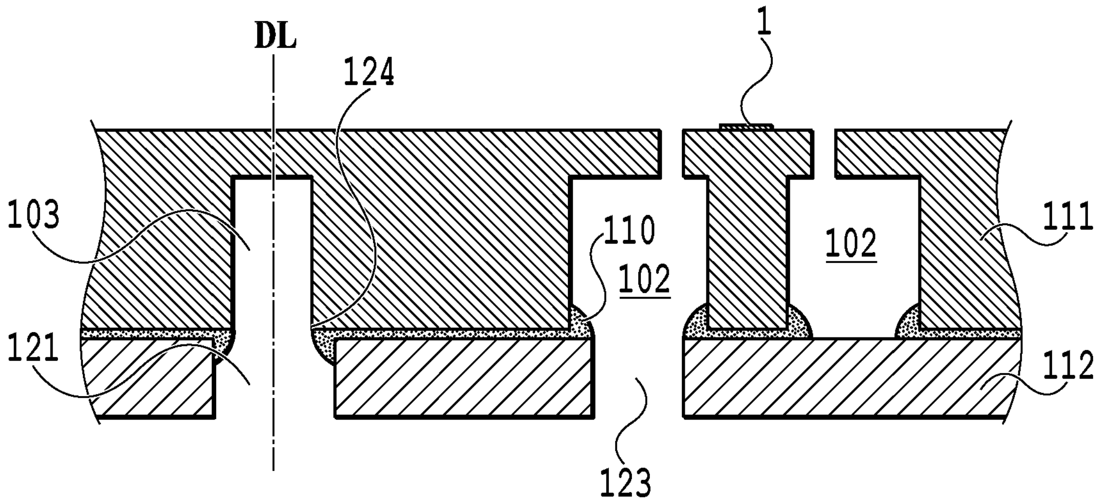
FIG. 7 is a view illustrating the first channel substrate and the second channel substrate joined to each other.

FIG. 7 is a view illustrating the first channel substrate 111 and the second channel substrate 112 joined to each other. In the joining of the first channel substrate 111 and the second channel substrate 112, the adhesive agent 110 softens as a result of being heated, and the first channel substrate 111 and the second channel substrate 112 are pressed against each other, so that the adhesive agent 110 gets pushed out of the joining surfaces and flows into the openings 121.

At the portions where the grooves 103 in the first channel substrate 111 and the openings 121 in the second channel substrate 112 are provided, steps are formed due to the relation between the width W1 of the grooves 103 and the width W2 of the openings 121 (width W1<width W2). The adhesive agent 110 accumulates and gets held at these step portions 124. The step portions 124 are present at the surface of the first channel substrate 111 from which the grooves 103 are formed. By holding the adhesive agent 110 with the action of capillary forces at the step portions 124, the adhesive agent 110 is prevented from flowing into the grooves 103.

In a case where the adhesive agent 110 is a thermosetting type and heating is performed inside a joining apparatus, the adhesive agent 110 may be heated inside the joining apparatus until it cures. Alternatively, the joined substrates may be taken out of the joining apparatus after being joined, and then heated inside a separate oven or the like to accelerate the curing of the adhesive agent. In a case where the adhesive agent 110 is a UV delayed curing type, the adhesive agent 110 is irradiated with a specified amount of UV rays before the joining, and then the substrates are joined. It is preferable to further heat the joined substrates after the joining to sufficiently accelerate the curing. In a case where the adhesive agent 110 is a UV curing type, the substrates are joined to each other and then the adhesive agent 110 is irradiated with a specified amount of UV rays through the substrate that is UV transmissive to cure. It is preferable to further heat the joined substrates after the joining to sufficiently accelerate the curing.

Figure 8:
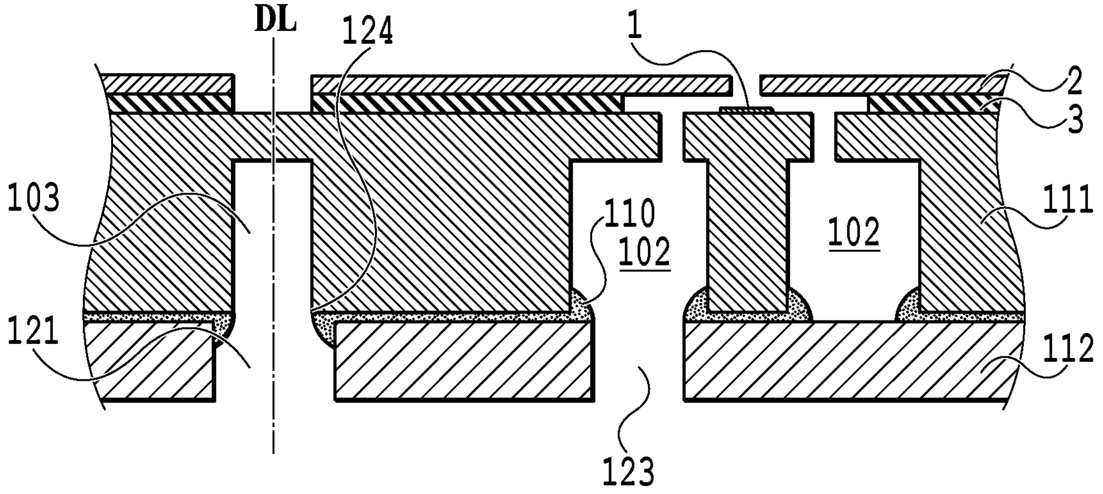
FIG. 8 is a view illustrating the first channel substrate on which a channel layer and a nozzle layer are provided and the second channel substrate.

FIG. 8 is a view illustrating the first channel substrate 111 on which the channel layer 3 and the nozzle layer 2 are provided, and the second channel substrate 112. A wafer for liquid ejection heads is completed by forming the channel layer 3 and the nozzle layer 2 on the first channel substrate 111 joined to the second channel substrate 112. This wafer for liquid ejection heads can be divided into individual chips by stealth dicing using a laser to obtain liquid ejection chips.

A method of manufacturing the wafer 100 will be described in a step-by-step order by using drawings.

Figure 9A:
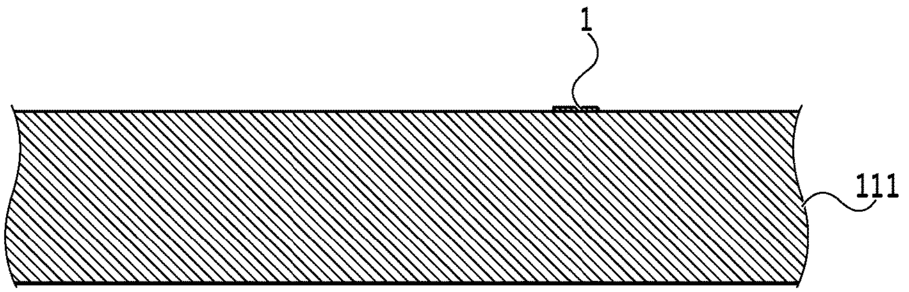
FIG. 9A is a view illustrating a step of forming the first channel substrate.
Figure 9B:
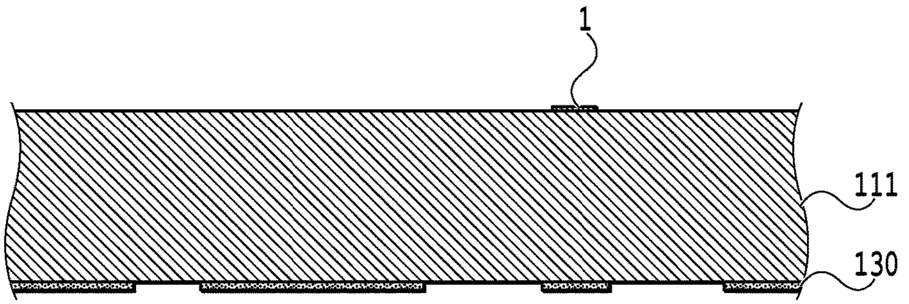
FIG. 9B is a view illustrating a step of forming the first channel substrate.

FIGS. 9A to 9D are views illustrating steps of forming the first channel substrate 111. First, as illustrated in FIG. 9A, a first channel substrate 111 is prepared on and in which are formed the energy generation elements 1 made of TaSiN, electric circuits not illustrated that drive the energy generation elements 1, and electric connection portions not illustrated that are to be electrically connected to electric connection substrates not illustrated. The first channel substrate 111 is made of silicon and thinned down to a thickness of 625 μm by a grinding apparatus. Then, as illustrated in FIG. 9B, an etching mask resist 130 is formed in conformity with the grooves for the through-holes 102 and the grooves 103 on the intended cutting lines by photolithography on the opposite surface to the surface on which the energy generation elements 1 are provided.

Figure 9C:
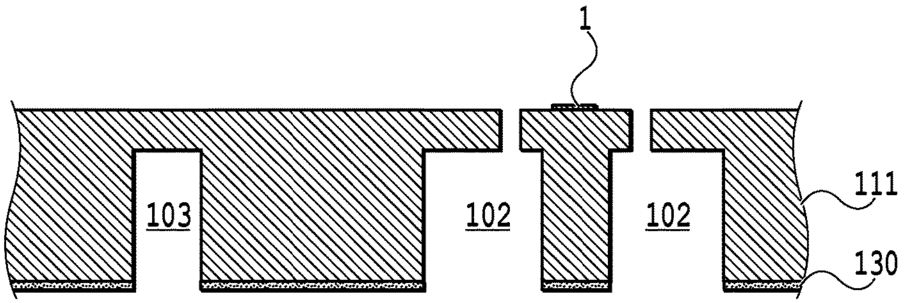
FIG. 9C is a view illustrating a step of forming the first channel substrate.

Then, as illustrated in FIG. 9C, the grooves for the through-holes 102 and the grooves 103 are simultaneously formed by the Bosch process to a process depth of 450 μm from the joining surface of the first channel substrate 111. The rate of this etching on the silicon is 7 μm/min, and the process time is 65 minutes.

Thereafter, in a step not illustrated, the etching mask resist is removed, and then an etching mask resist with openings provided only at portions to be through-channels is formed by photolithography on the surface where the energy generation elements 1 are formed. After that, in a step not illustrated, etching is performed by the Bosch process such that the non-penetrating holes formed in the first channel substrate 111 (the grooves for the through-holes 102) penetrate through the first channel substrate 111, and the etching mask resist is removed.

Figure 9D:
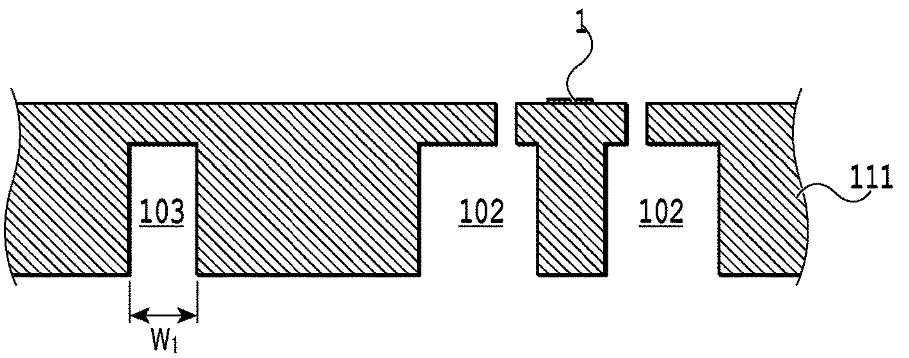
FIG. 9D is a view illustrating a step of forming the first channel substrate.

FIG. 9D illustrates the first channel substrate 111 formed by steps as described above. The through-holes 102 and the grooves 103 have been formed in the first channel substrate 111. The grooves 103 have been formed so as to have the width W1.

Figure 10:
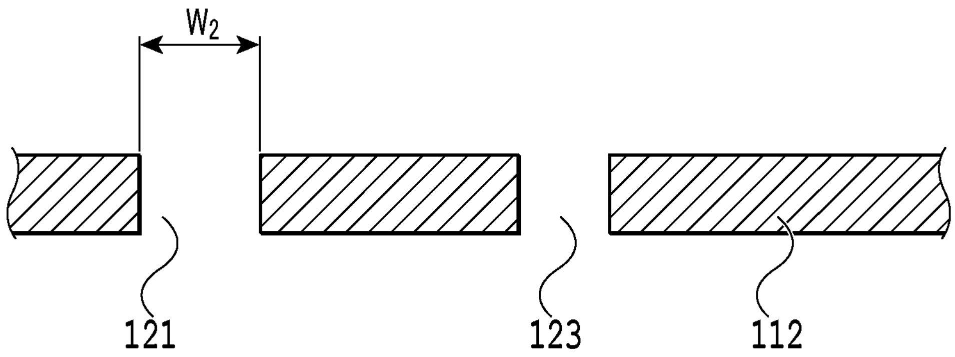
FIG. 10 is a view illustrating a step of forming the second channel substrate.

FIG. 10 is a view illustrating a step of forming the second channel substrate 112. For the second channel substrate 112, a silicon substrate with a thickness of 300 μm is prepared and etching is performed from one surface until penetrating through the substrate with protection tape attached the opposite surface to the etching surface to thereby form the through-holes 123 and the openings 121. Here, the openings 121 are formed so as to have the width W2 larger than the width W1.

Then, a PET film is prepared as an adhesive agent transfer substrate, and a benzocyclobutene solution is applied as the adhesive agent 110 to the adhesive agent transfer substrate to a thickness of 3 μm by spin coating. Moreover, the application is followed by a baking process at 100° C. for 5 minutes to cause the solvent to vaporize. The adhesive agent 110 applied to the transfer substrate is brought into contact with the joining surface of the first channel substrate 111 while being heated to thereby transfer the adhesive agent 110 to the first channel substrate 111.

Then, using a joining-alignment apparatus, the first channel substrate 111 and the second channel substrate 112 are positioned relative to each other and heated in a vacuum to be joined to each other. This joining is performed at a degree of vacuum of 100 Pa or less and a temperature of 150° C. The joining is followed by cooling, after which the first channel substrate 111 and the second channel substrate 112 joined to each other (joined body) are taken out of the joining-alignment apparatus and subjected to heat treatment at 250° C. for 1 hour in an oven containing a nitrogen atmosphere to cure the adhesive agent 110.

Then, a propylene glycol methyl ether acetate (PGMEA) solvent with a negative photosensitive resin dissolved therein is applied onto a PET film by spin coating. The mixture after the spin coating is dried at 100° C. in an oven to become a dry film, which is then transferred onto the surface of the first channel substrate 111 on which the energy generation elements are formed. Then, the PET film is removed. As a result, a photosensitive resin layer is formed. The photosensitive resin layer is exposed a pattern that will become channels. This is followed by post exposure bake (PEB) to obtain a latent image. Subsequently, similarly, a dry film is laminated and exposed to a pattern that will become the ejection ports, which is followed by PEB. Then, the channels and the nozzles are collectively developed. As a result, the wafer 100 for liquid ejection heads is completed. Liquid ejection chips can be obtained from the wafer 100 by stealth dicing using a laser in which multiple modified layers are formed inside the silicon substrate in the thickness direction of the substrate and an external force is applied to the wafer 100 to make a crack between the modified portions and thus divide the wafer 100.

Figure 11A:
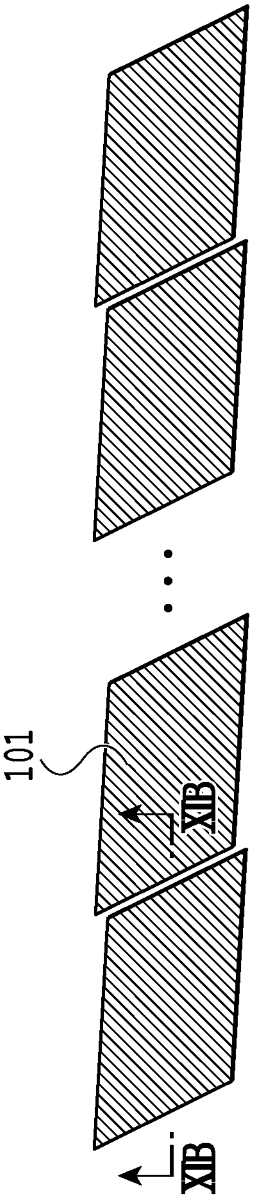
FIG. 11A is a view illustrating arrayed liquid ejection chips.
Figure 11B:
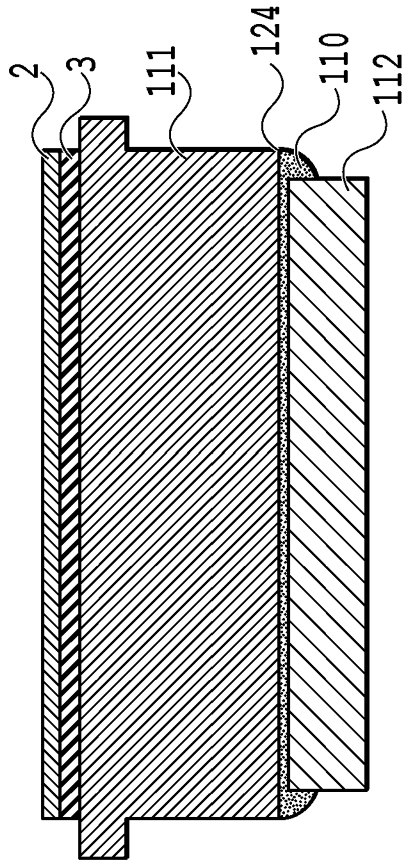
FIG. 11B is a view illustrating one of the arrayed liquid ejection chips.

FIG. 11A is a view illustrating arrayed liquid ejection chips 101. An in-line liquid ejection head can be obtained by arraying multiple liquid ejection chips 101 in a line as illustrated in FIG. 11A. FIG. 11B is a cross-sectional view along XIb-XIb in FIG. 11A, illustrating a cross section of one liquid ejection chip. As illustrated in FIG. 11B, a liquid ejection chip formed by the method of the present embodiment is such that the second channel substrate 112 is smaller than the first channel substrate 111, and the first channel substrate 111 and the second channel substrate 112 form the step portions 124 on the side surfaces of the liquid ejection chip.

Specifically, at the side surfaces of the liquid ejection chip, the side surfaces of the first channel substrate 111 project outward of the side surfaces of the second channel substrate 112, thereby forming the step portions 124. The adhesive agent 110 sticking out as a result of joining accumulates and cures at these step portions 124. Owing to these step portions 124, the adhesive agent 110 does not accumulate in the grooves 103 in the first channel substrate 111. This prevents formation of the adhesive agent 110 projecting from the side surfaces of the liquid ejection chip 101 and curing there. Hence, an in-line liquid ejection head with no interference between adjacent chips can be obtained.

As described above, the step portions 124 are provided on the side surfaces of each liquid ejection chip by using the first channel substrate 111 and the second channel substrate 112, and the adhesive agent 110 is caused to accumulate at the step portions 124 (adhesive agent accumulation portion). In this way, it is possible to provide a wafer, and a liquid ejection chip which are capable of preventing a decrease in yield.

Second Embodiment

A second embodiment of the present invention will be described below with reference to drawings. Note that the basic configuration in the present embodiment is similar to that in the first embodiment, and the characteristic configuration will therefore be described below.

Figure 12A:
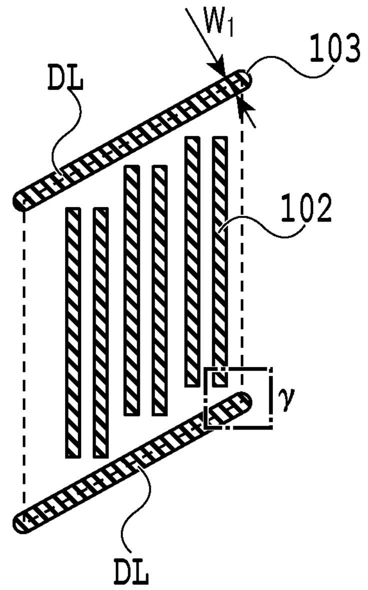
FIG. 12A is a view illustrating through-holes and grooves in a first channel substrate.
Figure 12B:
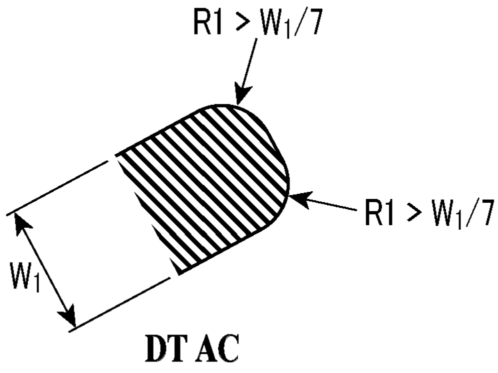
FIG. 12B is a view illustrating a groove in the first channel substrate.

FIG. 12A is a view illustrating through-holes 102 and grooves 103 in the first channel substrate 111 in the present embodiment. FIG. 12B is an enlarged view of the γ section in FIG. 12A.

The grooves 103 extend along the intended cutting lines DL in the first channel substrate 111. Here, the grooves 103 in the present embodiment are such that a curved portion with a radius R1 being more than or equal to 1/7 of the width W1 is provided at each of corner portions of the opposite ends in the direction of extension along the intended cutting lines DL (cutting direction). Specifically, in a case where the width of the grooves 103 in the first channel substrate 111 is 100 μm, a curved portion with R1=50 μm is provided at each of the corner portions of the ends.

From the perspective of a liquid ejection chip, at the ends of side surfaces of the first channel substrate 111 in the direction of extension of the intended cutting lines DL, the curved portions with the radius R1 are formed each of which is centered at an axis located at a region outside the first channel substrate 111 and perpendicular to the plane in which the energy generation elements 1 are formed.

In the present embodiment, the first channel substrate 111 and the second channel substrate 112 are joined by the adhesive agent 110 that is thicker than that in the first embodiment. However, providing the curved portions with a radius that is ½ of the groove width at the ends of the grooves 103 reduces the effect of capillary forces at the corner portions of the grooves 103 on the adhesive agent 110 sticking out of the joining portion between the first channel substrate 111 and the second channel substrate 112. This prevents the adhesive agent 110 from flowing in to the bottoms of the grooves 103.

The adhesive agent 110 sticking out of the joining portion between the first channel substrate 111 and the second channel substrate 112 is already inside the grooves 103 and the openings 121 at the point of sticking out. Here, capillary forces at the corner portions of the grooves 103 may act on the adhesive agent so as to let it reach the bottoms of the grooves 103, which will lead to formation of the piece 11 of the adhesive agent as illustrated in FIG. 2B. However, by preventing the adhesive agent 110 from flowing in to the bottoms of the grooves 103 as in the present embodiment, it is possible to prevent the formation of pieces of the adhesive agent.

Also, the adhesive agent 110 sticking out of the joining portion between the first channel substrate 111 and the second channel substrate 112 receives capillary forces at the corner portions of the openings 121 in the second channel substrate 112. Accordingly, the adhesive agent 110 remains in the openings 121 and does not flow into the grooves 103. This prevents the adhesive agent 110 from flowing in to the bottoms of the grooves 103.

As described above, providing the curved portions with R1=50 μm at the corner portions of the ends of the grooves 103 in the first channel substrate 111 reduces the effect of capillary forces at the corner portions of the ends of the grooves 103, and thus prevents the adhesive agent 110 from flowing into the grooves 103.

Note that the present embodiment may be combined with the first embodiment.

(Modification)

Figure 13A:
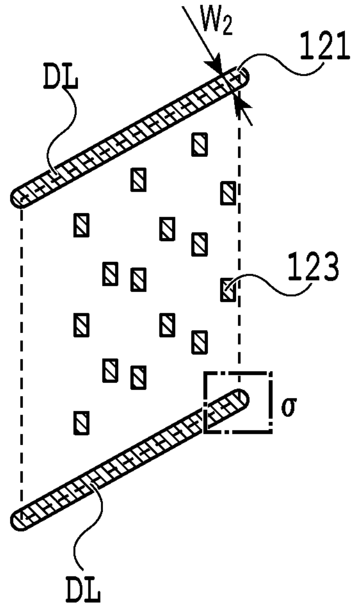
FIG. 13A is view illustrating openings and through-holes in a second channel substrate.
Figure 13B:
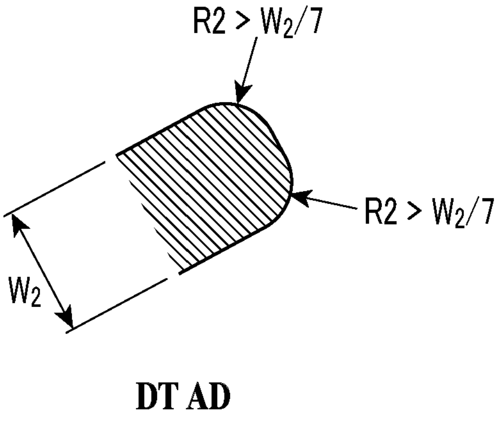
FIG. 13B is view illustrating an opening in the second channel substrate.

FIG. 13A is a view illustrating the openings 121 and the through-holes 123 in the second channel substrate 112 in another embodiment. FIG. 13B is an enlarged view of the σ section in FIG. 13A. In the present embodiment, curved portions with a radius R2 are provided at the corner portions of the ends of the openings 121 as well.

A curved portion with the radius R2 being more than or equal to 1/7 of the width W2 is provided at each of the corner portions of both ends of the openings 121 in the present embodiment. Specifically, in a case where the width of the openings 121 in the second channel substrate 112 is 120 μm, a curved portion with R2=40 μm is provided at each of the corner portions of the ends.

From the perspective of a liquid ejection chip, at the ends of side surfaces of the second channel substrate 112 in the direction of extension of the intended cutting lines DL, the curved portions with the radius R2 are formed each of which is centered at an axis located at a region outside the second channel substrate 112 and perpendicular to the surface to be joined to the first channel substrate 111.

As described above, curved portions with a smaller radius than the radius of the curved portions of the grooves 103 in the first channel substrate 111 are provided at the corner portions of the openings 121 in the second channel substrate 112. This reduces the amount of the adhesive agent 110 to be moved by capillary forces along the curved portions of the openings 121 in the second channel substrate 112 onto the curved portions of the grooves 103 with a larger radius. Accordingly, accumulation of the adhesive agent 110 at the bottoms of the grooves 103 is prevented.

Here, due to providing curved portions with a radius that is ⅓ of the width of the openings 121 in the second channel substrate 112 at the corner portions, the adhesive agent 110 flows in along the corners of the openings 121 but does not reach the surface of the second channel substrate 112, and therefore does not contaminate the surface.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-195579 filed Dec. 7, 2022, which is hereby incorporated by reference wherein in its entirety.

What is claimed is:

1. A wafer comprising:

a first substrate in which a groove is formed;

a second substrate which is joined by an adhesive agent to a surface of the first substrate where the groove is formed, and in which an opening is formed at a position where the opening overlaps the groove in a state where the first substrate and the second substrate are joined to each other; and an adhesive agent accumulation portion at which the adhesive agent coming out of a gap between the first substrate and the second substrate accumulates and stays away from a bottom of the groove, wherein the wafer is to be cut along the groove and the opening.

2. The wafer according to claim 1, wherein the adhesive agent accumulation portion is a step portion formed at a position where the groove and the opening overlap each other, and satisfies a relation of W1<W2, where W1 is a width of the groove in a width direction crossing a cutting direction, and W2 is a width of the opening in the width direction.

3. The wafer according to claim 1, wherein at a corner portion of an end of the groove in a cutting direction, the groove has a curved portion with a radius R1 that is more than or equal to 1/7 of a width W1 being a width of the groove in a width direction crossing the cutting direction.

4. The wafer according to claim 3, wherein the adhesive agent accumulation portion is a corner portion of an end of the opening in the cutting direction.

5. The wafer according to claim 3, wherein a width W2 being a width of the opening in the width direction satisfies a relation of W1<W2, and wherein at a corner portion of an end of the opening in the cutting direction, the opening has a curved portion with a radius R2 that is more than or equal to 1/7 of the width W2.

6. The wafer according to claim 1, further comprising:

an energy generation element which is formed on a front surface of the first substrate and generates an energy for ejecting a liquid;

a channel layer in which is formed a channel for guiding the liquid supplied from a through-hole in the first substrate to the energy generation element; and a nozzle layer in which an ejection port for ejecting the liquid is formed.

7. A liquid ejection chip formed by cutting a wafer comprising:

a first substrate in which a groove is formed; and a second substrate which is joined by an adhesive agent to a surface of the first substrate where the groove is formed, and in which an opening is formed at a position where the opening overlaps the groove in a state where the first substrate and the second substrate are joined to each other;

an adhesive agent accumulation portion at which the adhesive agent coming out of a gap between the first substrate and the second substrate accumulates and stays away from a bottom of the groove;

an energy generation element which is formed on a front surface of the first substrate and generates an energy for ejecting a liquid;

a channel layer in which is formed a channel for guiding the liquid supplied from a through-hole in the first substrate to the energy generation element; and a nozzle layer in which an ejection port for ejecting the liquid is formed, wherein the wafer is to be cut along the groove and the opening, and wherein the liquid ejection chip is formed by cutting the wafer along the groove and the opening.

8. A liquid ejection chip comprising:

a first substrate in which energy generation elements for generating an energy for ejecting a liquid are arrayed;

a second substrate joined by an adhesive agent to a second surface of the first substrate opposite to a first substrate thereof on which the energy generation elements are formed; and an adhesive agent accumulation portion at which the adhesive agent coming out of a gap between the first substrate and the second substrate accumulates and stays away from a side surface of the first substrate in a direction crossing an array direction of the energy generation elements, wherein the liquid ejection chip is formed by cutting the side surface of the first substrate.

* * * * *